(12) United States Patent
Huang

(10) Patent No.: US 8,745,189 B2
(45) Date of Patent: Jun. 3, 2014

(54) METHOD AND POWER-SAVING CONTROL DEVICE FOR CONTROLLING OPERATIONS OF COMPUTING UNITS

(75) Inventor: I-Hsiang Huang, Taipei (TW)

(73) Assignee: Tatung Company, Taipei (TW)

( * ) Notice: Subject to any disclaimer, the term of this patent is extended or adjusted under 35 U.S.C. 154(b) by 218 days.

(21) Appl. No.: 13/232,970

(22) Filed: Sep. 14, 2011

(65) Prior Publication Data
US 2013/0067071 A1 Mar. 14, 2013

(51) Int. Cl.
*G06F 15/173* (2006.01)

(52) U.S. Cl.
USPC .......................................... 709/223

(58) Field of Classification Search
USPC ........................... 709/201, 223–224
See application file for complete search history.

(56) References Cited

U.S. PATENT DOCUMENTS

| 7,533,281 | B2 | 5/2009 | Hsieh | |
|---|---|---|---|---|
| 2005/0060590 | A1 | 3/2005 | Bradley et al. | |
| 2009/0119233 | A1* | 5/2009 | Dunagan et al. | 705/412 |
| 2009/0150700 | A1 | 6/2009 | Dell'Era | |
| 2010/0070784 | A1 | 3/2010 | Gupta et al. | |
| 2010/0265908 | A1* | 10/2010 | Xue et al. | 370/329 |
| 2011/0066727 | A1* | 3/2011 | Palmer et al. | 709/224 |
| 2011/0072293 | A1* | 3/2011 | Mazzaferri et al. | 713/340 |
| 2011/0208875 | A1* | 8/2011 | Hasson et al. | 709/238 |

FOREIGN PATENT DOCUMENTS

| TW | I245986 | 12/2005 |
|---|---|---|
| TW | 201013384 | 4/2010 |

OTHER PUBLICATIONS

Yi-Ting Lee, "Forecasting Models for Service Requirements of Network Nodes, Using MRU, AR-PST, SMA and WMA", Thesis for Master of Science Graduate Institute of Communication Engineering Tatung University, Jul. 23, 2009, pp. 1-pp. 160.

* cited by examiner

*Primary Examiner* — Jason Recek
(74) *Attorney, Agent, or Firm* — Jianq Chyun IP Office

(57) ABSTRACT

A method and a power-saving control device for controlling operations of a plurality of computing units are provided. The method includes pre-estimating network service demands for the computing units within a next period. The method further includes: before the next period, calculating a first number and a second number of the computing units which are expected to be respectively in a busy state and a standby state within the next period according to the pre-estimated network service demands. The method further includes controlling the computing units such that the numbers of the computing units which are in the busy state and the standby state within the next period are respectively equal to the first number and the second number.

19 Claims, 9 Drawing Sheets

US 8,745,189 B2

METHOD AND POWER-SAVING CONTROL DEVICE FOR CONTROLLING OPERATIONS OF COMPUTING UNITS

BACKGROUND OF THE INVENTION

1. Field of the Invention

The invention relates to a method and a power-saving control device for controlling operations of a plurality of computing units. Particularly, the invention relates to a method for controlling operations of a plurality of computing units based on pre-estimated network service demands, and a power-saving control device using the same.

2. Description of Related Art

With a development trend of information electronization, data flow of network and data storage amount are continually increased, so that power consumption of a computer room is correspondingly increased. Referring to FIG. 1, FIG. 1 is a pie chart illustrating power consumption ratios of various equipments in a conventional computer room. In the computer room, power is consumed by server operations, computer room cooling devices, central cooling devices, power room cooling devices, office areas and lights, etc., in which server operations consume most of the power. Moreover, as the server operations are closely correlated with the cooling system, when the power consumption of the server operations is reduced, the power consumption of the cooling system can be simultaneously reduced.

Moreover, in many computer rooms, high-availability cluster servers are generally used. However, operation of the current high-availability cluster server is manually controlled by an operator according to business demands, customer connection demands, etc. based on experiences. However, such control method of the high-availability cluster server is not only inaccurate, but also labor-consuming.

SUMMARY OF THE INVENTION

The invention is directed to a method and a power-saving control device for controlling operations of a plurality of computing units. Based on pre-estimated network service demands, numbers of the computing units in different operation states are managed, so as to reduce power consumption of the computing units.

The invention provides a method for controlling operations of a plurality of computing units. The method includes pre-estimating network service demands for the computing units within a next period. The method further includes: before the next period, calculating a first number $N_{N1}$ of the computing units expected to be in a busy state and a second number $N_{N2}$ of the computing units expected to be in a standby state within the next period according to the pre-estimated network service demands. The method further includes controlling the computing units such that the numbers of the computing units that are in the busy state and the standby state within the next period are respectively equal to the first number $N_{N1}$ and the second number $N_{N2}$.

The invention provides a power-saving control device for controlling operations of a plurality of computing units. The power-saving control device includes a storage module, a prediction module, and a control module. The storage module is used for storing data. The prediction module is used for pre-estimating network service demands for the computing units within a next period according to the data stored in the storage module. Before the next period, the control module calculates a first number $N_{N1}$ of the computing units expected to be in a busy state and a second number $N_{N2}$ of the computing units expected to be in a standby state within the next period according to the pre-estimated network service demands. The control module further controls the computing units such that the numbers of the computing units that are in the busy state and the standby state within the next period are respectively equal to the first number $N_{N1}$ and the second number $N_{N2}$.

In an embodiment of the invention, the power-saving control device further includes a load balance module and a monitor module. The load balance module is used for guiding the network service demands to the normal computing units and distributing the network service demands to the normal computing units according to computing capability of each of the computing units. The monitor module is used for monitoring each of the computing units, reporting state variations of the computing units to the load balance module when states of the computing units are varied, and updating the data in the storage module.

In an embodiment of the invention, the prediction module further pre-estimates network service demands $L_P$ for the computing units within a present period, pre-estimates a total amount $N_{SYN}$ of network service requests to be received by the computing units within the next period, and pre-estimates a total amount $N_{FIN}$ of network service termination requests to be received by the computing units within the next period, where the pre-estimated network service demands for the computing units within the next period is $(L_P + N_{SYN} - N_{FIN})$.

In an embodiment of the invention, the first number $N_{N1}$ is a smallest integer not less than $$\left(\frac{L_N}{L_{PV} \times V_P}\right),$$

where $V_P$ is a number of virtual machines averagely executed by each of the computing units, $L_{PV}$ is network service demands processed by each of the virtual machines, and $L_N$ is the pre-estimated network service demands within the next period. In an embodiment of the invention, the second number $N_{N2}$ is a smallest integer not less than $(N_{N1} \times R_B)$, where $R_B$ is a backup ratio, $0 \leq R_B \leq 1$.

In an embodiment of the invention, the control module further obtains a number $N_{P1}$ of the computing units that are in the busy state within the present period, and determines whether the number $N_{P1}$ of the computing units that are in the busy state within the present period is greater than the first number $N_{N1}$. Moreover, the control module further controls $(N_{P1} - N_{N1})$ computing units that are presently in the busy state to disable services thereof and enter the standby state when the number $N_{P1}$ of the computing units that are in the busy state within the present period is greater than the first number $N_{N1}$.

In an embodiment of the invention, after controlling the $(N_{P1} - N_{N1})$ computing units that are presently in the busy state to disable services thereof and enter the standby state, the control module turns off $(N_{P2} - N_{N2})$ computing units that are in the standby state if a number $N_{P2}$ of the computing units that are presently in the standby state is greater than the second number $N_{N2}$.

In an embodiment of the invention, when the number $N_{P1}$ of the computing units that are in the busy state within the present period is equal to or smaller than the first number $N_{N1}$, the control module further determines whether $(N_{N1} + N_{N2} - N_{P1} - N_{P2})$ is smaller than or equal to a number $N_{P3}$ of the computing units that are presently in an off state, and $N_{P2}$ is the number of the computing units that are presently in the standby state. When ($N_{N1}+N_{N2}-N_{P1}-N_{P2}$) is smaller than or equal to the number $N_{P3}$, the control module turns on ($N_{N1}+N_{N2}-N_{P1}-N_{P2}$) computing units that are in the off state, and controls ($N_{N2}-N_{P2}$) computing units that are presently in the busy state to disable services thereof and enter the standby state.

In an embodiment of the invention, when ($N_{N1}+N_{N2}-N_{P1}-N_{P2}$) is greater than the number $N_{P3}$, the control module turns on $N_{P3}$ computing units that are in the off state.

In an embodiment of the invention, after turning on $N_{P3}$ computing units that are in the off state, the control module updates the number $N_{P1}$ of the computing units that are in the busy state within the present period, and determines whether the updated number $N_{P1}$ is greater than or equal to the first number $N_{N1}$. When the updated number $N_{P1}$ is greater than or equal to the first number $N_{N1}$, the control module controls ($N_{P1}-N_{N1}$) computing units that are presently in the busy state to disable services thereof and enter the standby state.

In an embodiment of the invention, when the updated number $N_{P1}$ is smaller than the first number $N_{N1}$, the control module further determines whether ($N_{P1}+N_{P2}$) is greater than or equal to the first number $N_{N1}$. When ($N_{P1}+N_{P2}$) is greater than or equal to the first number $N_{N1}$, the control module controls ($N_{N1}-N_{P1}$) computing units that are presently in the standby state to enable services thereof and enter the busy state.

In an embodiment of the invention, when ($N_{P1}+N_{P2}$) is smaller than the first number $N_{N1}$, the control module sends a warning signal, and controls $N_{P2}$ computing units that are presently in the standby state to enable services thereof and enter the busy state.

According to the above descriptions, the invention provides a method and a power-saving control device for controlling operations of a plurality of computing units, by which based on pre-estimated network service demands, numbers of the computing units in different operation states are controlled, so as to reduce power consumption of the computing units.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
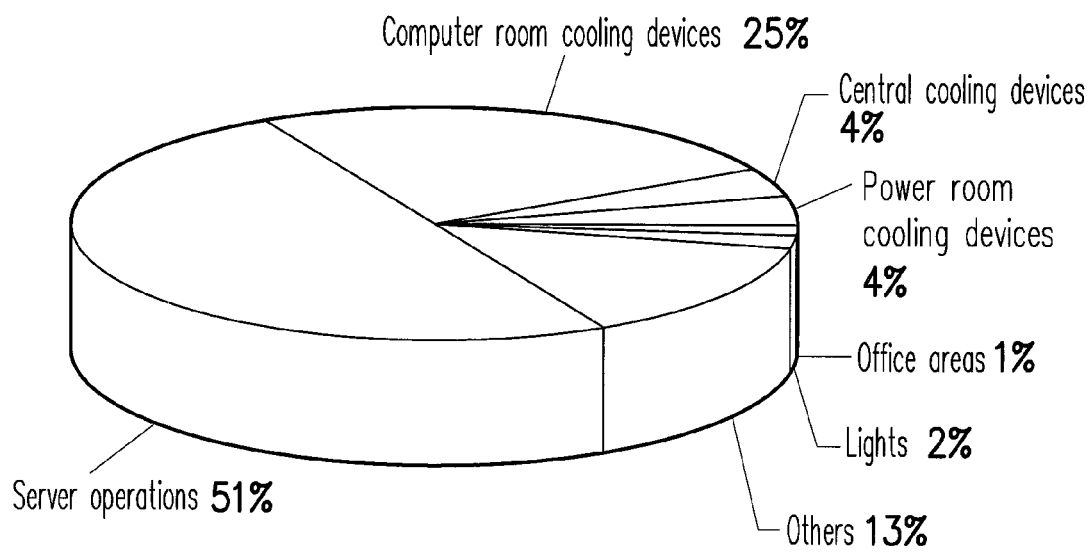
FIG. 1 is a pie chart illustrating power consumption ratios of various equipments in a conventional computer room.
Figure 2:
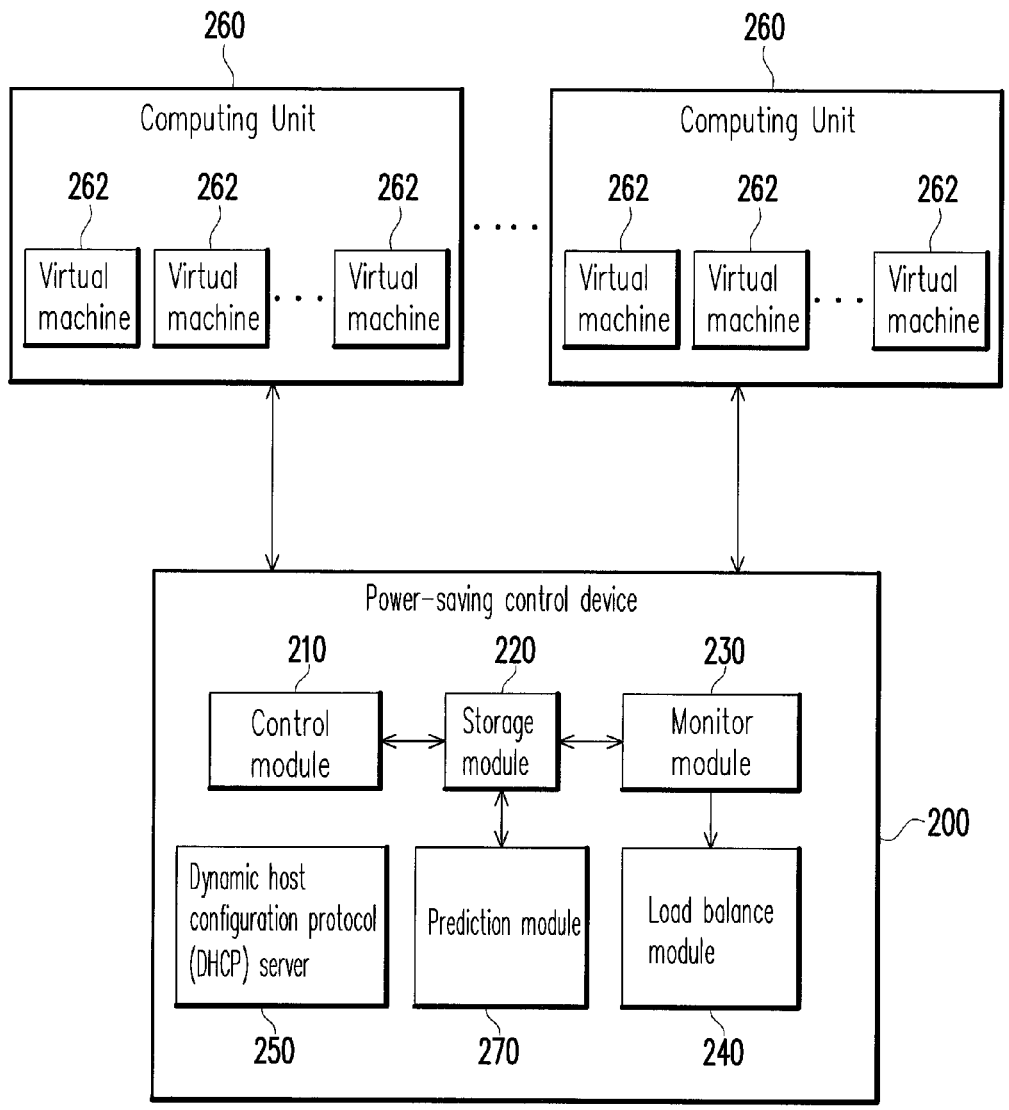
FIG. 2 is a functional block diagram of a power-saving control device and a plurality of computing units according to an embodiment of the invention.

Referring to FIG. 2, FIG. 2 is a functional block diagram of a power-saving control device and a plurality of computing units 260 according to an embodiment of the invention. The power-saving control device 200 can control operations of a plurality of the computing units 260. In an embodiment of the invention, the power-saving control device 200 and the computing units 260 are constructed in a same room, and in another embodiment, the power-saving control device 200 and the computing units 260 are constructed in different rooms. In an embodiment of the present invention, each of the computing units 260 is used for providing a specific network service, for example, file sharing, webpage accessing, online game, etc. Moreover, in order to improve energy utilization efficiency of the computing units 260, in another embodiment of the invention, each of the computing units 260 can execute one or more of virtual machines 262, and each of the virtual machines 262 is used for providing the aforementioned specific network service. Moreover, in an embodiment of the present invention, each of the computing units 260 includes a server and the virtual machines 262, which are executed by the server. Furthermore, to efficiently use network addresses, the power-saving control device 200 may further include a dynamic host configuration protocol (DHCP) server 250 for managing and assigning the network address to each of the computing units 260 and each of the virtual machines 262. Generally, the network addresses used by the computing units 260 and the virtual machines 262 are different to each other.

The power-saving control device 200 has a storage module 220, a prediction module 270, and a control module 210. The storage module 220 is used for storing data and could be a database, a memory space or the like. The control module 210 cooperates with various components of the power-saving control device 200. The data stored in the storage module 220, for example, includes historic records of network service demands of various periods, states of the computing units 260, or specifications of the computing units 260, etc. The control module 210 controls each of the computing units 260 to be in a busy state, a standby state, or an off state every a predetermined time period according to the data stored in the storage module 220. The predetermined time period is, for example, 15 minutes, a half hour, one hour, or other time lengths, and the invention is not limited thereto. Moreover, since the control module 210 controls the states of the computing units 260 every the predetermined time period, the states of the computing units 260 are not varied all the time, but varied under control of the control module 210. In other words, the states of the computing units 260 are varied in batches. In this way, excessive power consumption caused by frequent variation of the states of the computing units 260 is avoided.

In an embodiment of the present invention, the state of each of the virtual machines 262 is associated with the state of the corresponding computing unit 260. When one of the computing units 260 is in the busy state, the computing unit 260 in the busy state is provided with electronic power, and all of the virtual machines 262 of the computing unit 260 are in the busy state and providing services thereof. When one of the computing units 260 is in the standby state, all of the virtual machines 262 of the computing unit 260 are in the standby state and stop providing services thereof. When one of the computing units 260 is in the off state, the computing unit 260 is powered down, and all of the virtual machines 262 of this computing unit 260 are turned off and in the off state accordingly.

Figure 3:
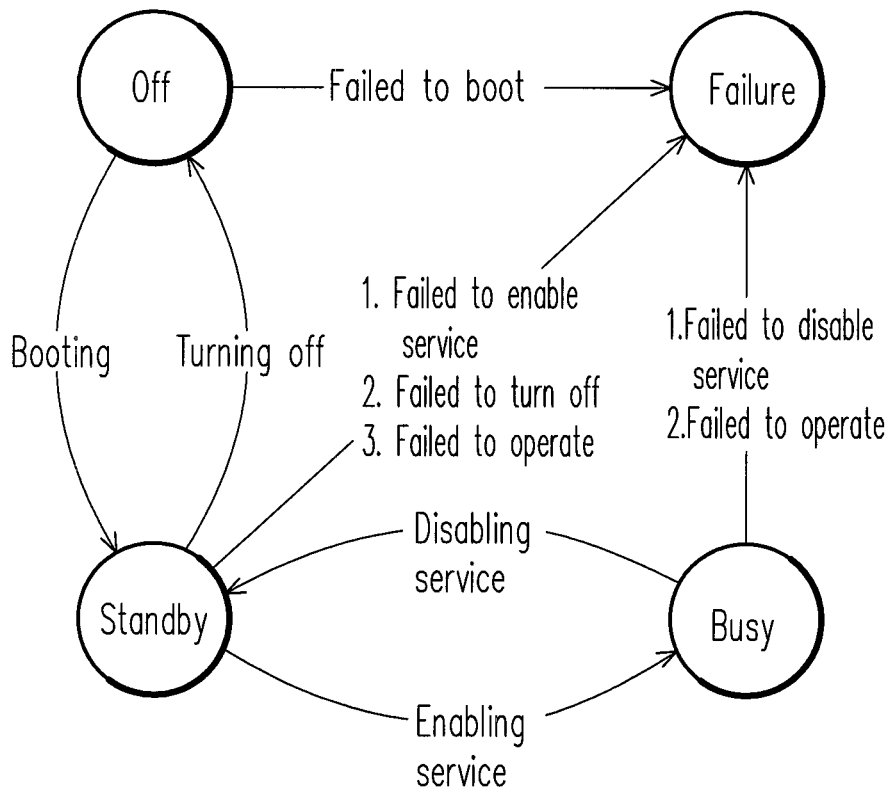
FIG. 3 is a diagram illustrating variations of the states of computing units according to an embodiment of the invention.

Referring to FIG. 3, FIG. 3 is a diagram illustrating variations of the states of the computing units 260 according to an embodiment of the invention. As described above, the control module 210 controls each of the computing units 260 to be in the busy state, the standby state, or the off state every the predetermined time period according to the data stored in the storage module 220. Basically, the off state is the initial state of each of the computing units 260. When the computing unit 260 boots successfully, it is varied from the off state to the standby state. However, if the computing unit 260 fails to boot, it is varied from the off state to a failure state. The failure state denotes that the computing unit 260 under such state is malfunctioned that needs to be reset or repaired. Generally, the normal computing unit 260 is in one of the aforementioned busy state, the standby state, and the off state, while the computing unit 260 in the failure state is regarded as an abnormal computing unit, and the number of the abnormal computing units is not included in the total number of the computing units 260. When the computing unit 260 in the standby state successfully enables service thereof, the state of the computing unit 260 is varied from the standby state to the busy state, and when the computing unit 260 in the standby state is successfully turned off, the state thereof is varied from the standby state to the off state. Comparatively, when the computing unit 260 in the standby state is failed to enable the service thereof, failed to be turned off, or failed to operate, the state thereof is varied from the standby state to the failure state. Moreover, when the computing unit 260 in the busy state successfully disables the service thereof, the state thereof is varied from the busy state to the standby state, and when the computing unit 260 in the busy state is failed to disable the service thereof or failed to operate, the state thereof is varied from the busy state to the failure state.

Figure 4:
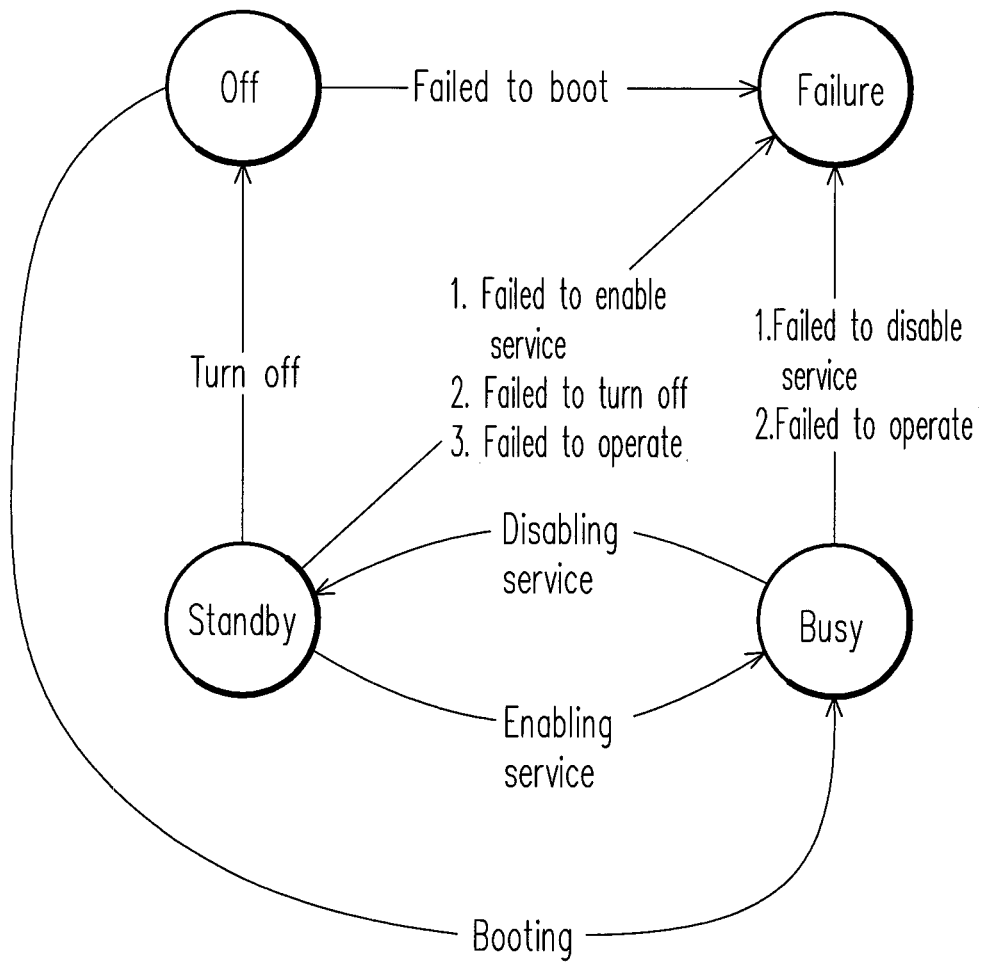
FIG. 4 is a diagram illustrating variations of the states of computing units according to another embodiment of the invention.

Referring to FIG. 4, FIG. 4 is a diagram illustrating variations of the states of the computing units 260 according to another embodiment of the invention. The state variations shown in FIG. 4 is approximately the same to that of FIG. 3, and a difference there between is that according to the state variations of the computing units 260 shown in FIG. 4, when the computing unit 260 in the off state boots successfully, the service provided by the computing unit 260 is accordingly enabled during the booting process, so that the state of the computing unit 260 is directly varied from the off state to the busy state. Variations of the other states are similar to that of FIG. 3, so that details thereof are not repeated.

Figure 5:
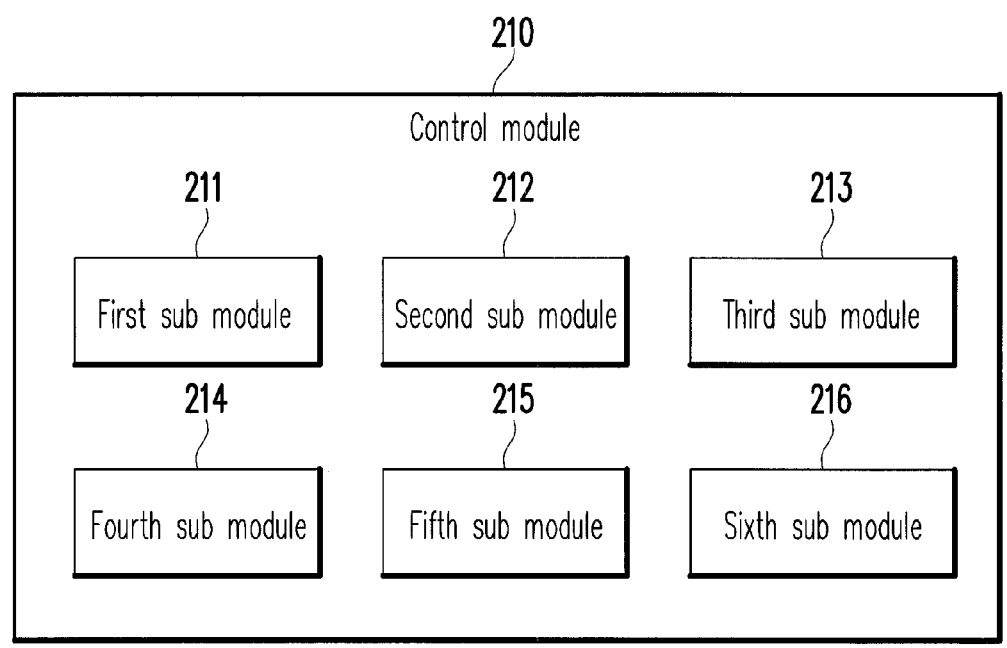
FIG. 5 is a functional block diagram of a control module according to an embodiment of the invention.

Referring to FIG. 5, FIG. 5 is a functional block diagram of a control module 210 according to an embodiment of the invention. In the present embodiment, to facilitate a designer to efficiently design and manage the control module 210, the control module 210 may have a first sub module 211, a second sub module 212, a third sub module 213, a fourth sub module 214, a fifth sub module 215, and a sixth sub module 216. The first to sixth sub modules 211-216 can be implemented by a hardware form, a firmware form or a software form. When the first to sixth sub modules 211-216 are implemented by the software form, each of the sub modules in the first to sixth sub modules 211-216 can be compiled as a function library which could be called by other programs. The first sub module 211 controls related operations of writing data into the storage module 220, and the second sub module 212 controls related operations of reading data from the storage module 220. The third sub module 213 controls related operations of turning on (i.e. booting) the computing units 260, and the fourth sub module 214 controls related operations of turning off the computing units 260. The fifth sub module 215 controls related operations of enabling services of the computing units 260, and the sixth sub module 216 controls related operations of disabling services of the computing units 260.

Referring to FIG. 2, in an embodiment of the invention, the power-saving control device 200 further includes a load balance module 240 and a monitor module 230. The load balance module 240 is used for guiding the network service demands to the normal computing units and distributing the network service demands to the normal computing units 260 according to computing capability of each of the computing units 260. The monitor module 230 is used for monitoring each of the computing units 260 (including the virtual machines 262), reporting state variations of the computing units 260 to the load balance module 240 when the states of the computing units 260 are varied, and updating the data in the storage module 220, so that the data related to the states of the computing units 260 in the storage module 220 can be opportunely updated. In an embodiment of the invention, the load balance module 240 is, for example, a virtual server in a Linux operating system.

Referring to FIG. 2 and FIG. 5, in an embodiment of the invention, when any one of the first to sixth sub modules 211-216 performs related control operations on any one of the computing units 260, an actual operation status of the related computing unit 260 may be obtained from the monitor module 230. If the related computing unit 260 cannot reach an expected state within a predetermined time limit (for example, 1 minute), the control module may select another computing unit 260 to perform the control operation, and the state of the originally selected computing unit 260 is varied to the aforementioned failure state. For example, when the fifth sub module 215 does not successfully control a certain computing unit 260 in the standby state to enable the service thereof within the predetermined time limit, the control module 210 is notified by the monitor module 230 that the computing unit 260 fails to enable the service thereof, and then the control module 210 varies the state of the originally controlled computing unit 260 to the failure state, and selects another computing unit 260 in the standby state to enable the service thereof.

Figure 6:
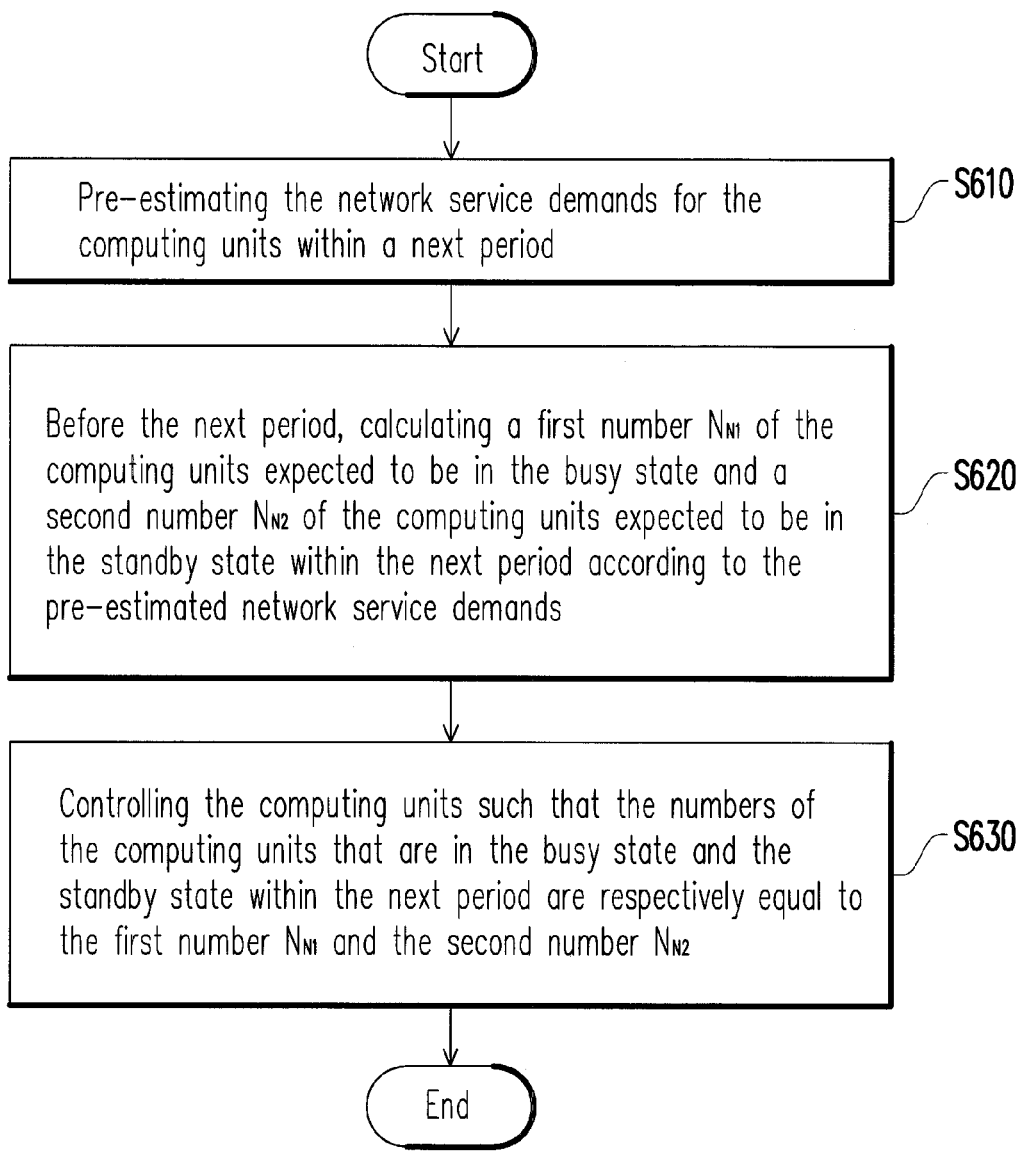
FIG. 6 is a flowchart illustrating a method for controlling operations of a plurality of computing units according to an embodiment of the invention.

Referring to FIG. 6, FIG. 6 is a flowchart illustrating a method for controlling operations of a plurality of computing units 260 according to an embodiment of the invention. First, the prediction module 270 pre-estimates the network service demands for the computing units 260 within a next period (step S610). In an embodiment of the invention, the prediction module 270 pre-estimates the network service demands for the computing units 260 within the next period according to the data stored in the storage module 220. Then, the prediction module 270 calculates a first number $N_{N1}$ of the computing units 260 expected to be in the busy state and a second number $N_{N2}$ of the computing units 260 expected to be in the standby state within the next period according to the pre-estimated network service demands before the next period (step S620). Finally, the control module 210 controls the computing units 260 such that the numbers of the computing units 260 that are in the busy state and the standby state within the next period are respectively equal to the first number $N_{N1}$ and the second number $N_{N2}$ (step S630).

Figure 7A:
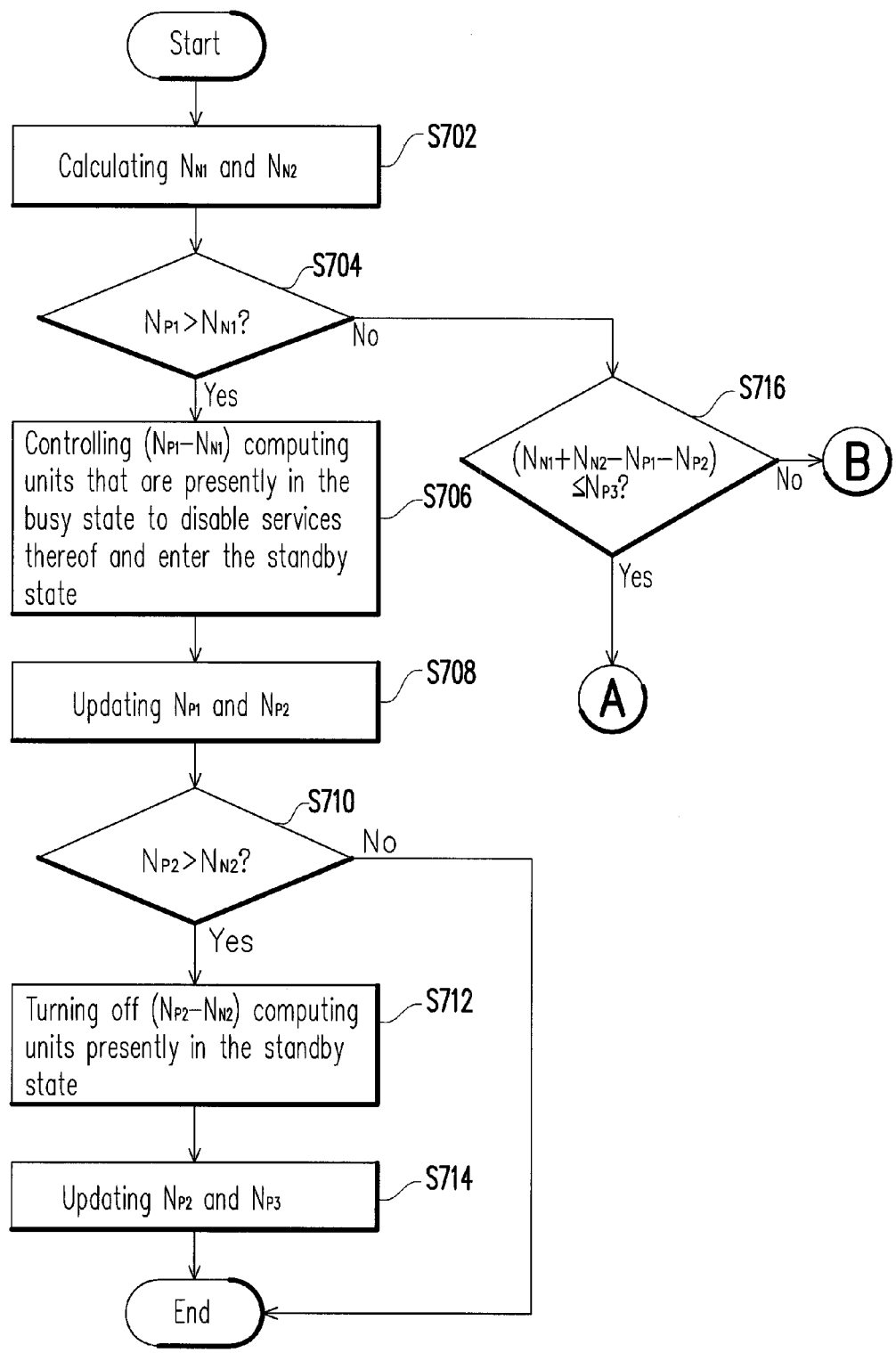
FIGS. 7A-7C are flowcharts illustrating a method for controlling operations of a plurality of computing units according to another embodiment of the invention.
Figure 7B:
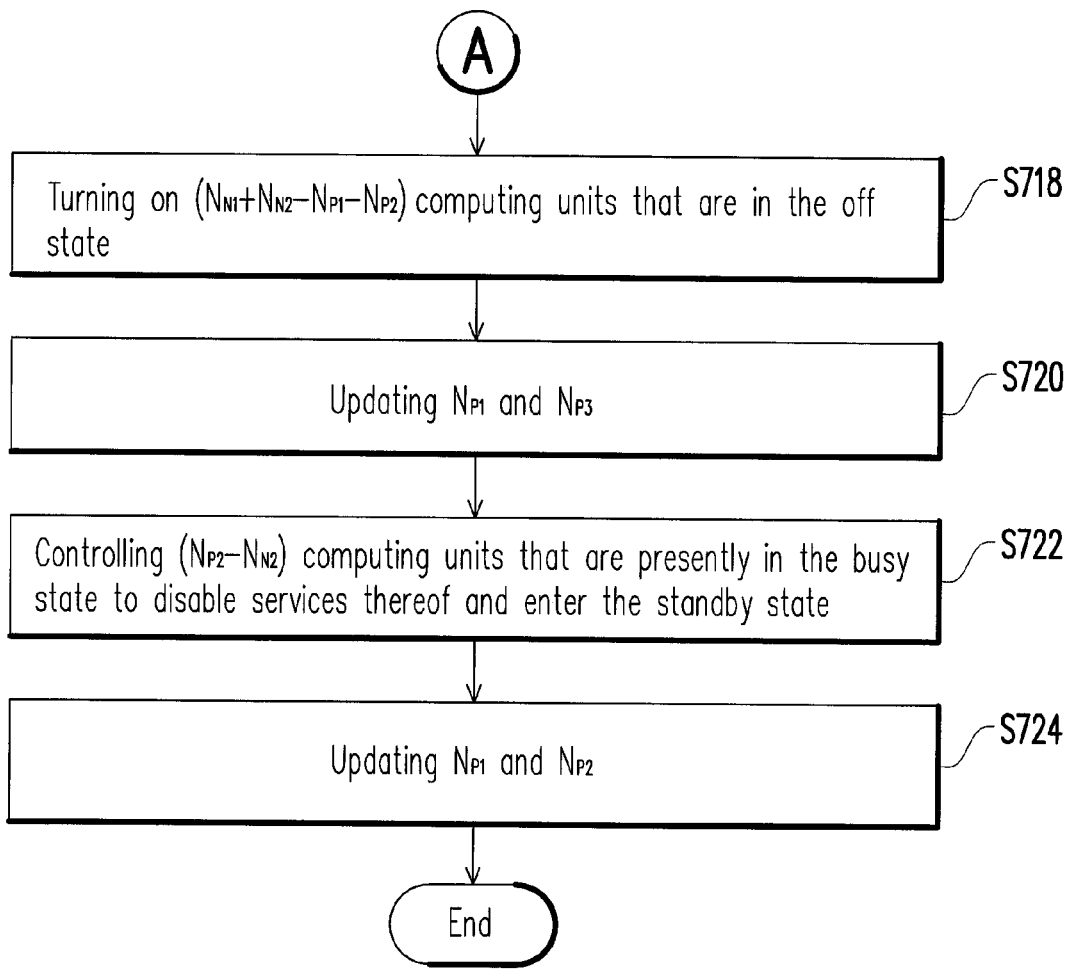
Figure 7C:
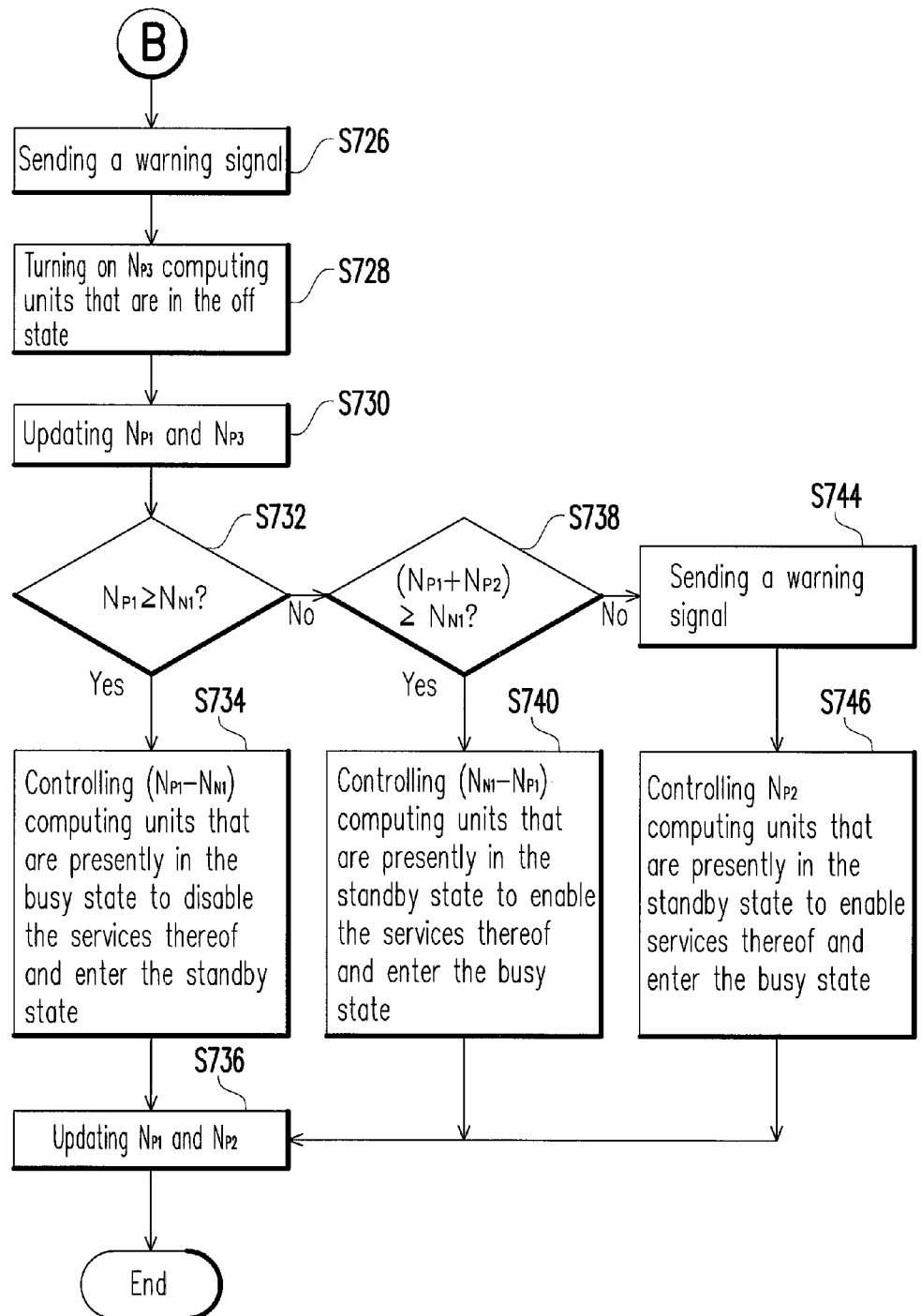

Referring to FIGS. 7A-7C, FIGS. 7A-7C are flowcharts illustrating a method for controlling operations of the plurality of computing units 260 according to another embodiment of the invention. In the present embodiment, state variations of the computing units 260 are as that shown in FIG. 4, i.e. when any of the computing units 260 in the off state is successfully turned on, the service provided by the computing unit 260 is accordingly enabled during the turning-on process, and the state of the computing unit 260 is directly varied from the off state to the busy state. According to the flowcharts illustrated in FIGS. 7A-7C, the prediction module 270 first pre-estimates the network service demands for the computing units 260 within the next period, and calculates the first number $N_{N1}$ and the second number $N_{N2}$ of the computing units 260 that are expected to be respectively in the busy state and the standby state within the next period according to the pre-estimated network service demands (step S702).

In an embodiment of the invention, when the prediction module 270 pre-estimates the network service demands for the computing units 260 within the next period, the prediction module 270 further obtains the network service demands $L_P$ for the computing units 260 within a present period, pre-estimates a total amount $N_{SYN}$ of network service requests to be received by the computing units 260 within the next period, and pre-estimates a total amount $N_{FIN}$ of network service termination requests to be received by the computing units 260 within the next period. In an embodiment of the invention, the pre-estimated network service demands for the computing units 260 within the next period is $(L_P+N_{SYN}-N_{FIN})$. In an embodiment of the present invention, the network service requests could be SYN (synchronize sequence numbers) messages, and the network service termination requests could be FIN (finished) messages.

Moreover, in an embodiment of the invention, the first number $N_{N1}$ is a smallest integer not less than $$\left(\frac{L_N}{L_{PV} \times V_P}\right),$$

where $V_P$ is a number of the virtual machines 262 averagely executed by each of the computing units 260, $L_{PV}$ is network service demands processed by each of the virtual machines 262, and $L_N$ is the pre-estimated network service demands within the next period. For example, when it is calculated that $$\left(\frac{L_N}{L_{PV} \times V_P}\right)$$

is equal to 14.531, the first number $N_{N1}$ is equal to 15. Moreover, in an embodiment of the invention, the second number $N_{N2}$ is a smallest integer not less than $(N_{N1} \times R_B)$, where $R_B$ is a backup ratio, which represents a ratio between a total number of the computing units 260 in the standby state and a total number of the computing units 260 in the busy state, and $0 \leq R_B \leq 1$. For example, when it is calculated that $(N_{N1} \times R_B)$ is equal to 5.165, the second number $N_{N2}$ is equal to 6, i.e. six computing units 260 are in the standby state to prepare to backup the computing units 260 in the busy state.

Referring back to FIGS. 7A-7C, in step S704, the control module 210 obtains a number $N_{P1}$ of the computing units 260 that are in the busy state within the present period, and determines whether the number $N_{P1}$ is greater than the first number $N_{N1}$. When the number $N_{P1}$ is greater than the first number $N_{N1}$, it represents that the number of the serves 260 in the busy state within the present period is excessive, and some of the computing units 260 are required to disable the services thereof in the next period. Accordingly, the control module 210 further controls $(N_{P1}-N_{N1})$ computing units 260 that are presently in the busy state to disable the services thereof and enter the standby state (step S706). Then, the control module 210 updates the numbers $N_{P1}$ and $N_{P2}$ of the computing units 260 that are presently in the busy state and the standby state (step S708). Then, the control module 210 determines whether the number $N_{P2}$ of the computing units 260 presently in the standby state is greater than the second number $N_{N2}$ (step S710). If the number $N_{P2}$ of the computing units 260 presently in the standby state is greater than the second number $N_{N2}$, it represents that the number of the serves 260 in the standby state within the present period is excessive, and it is required to turn off some of the computing units 260 in the next period. Accordingly, the control module 210 turns off $(N_{P2}-N_{N2})$ computing units 260 presently in the standby state (step S712). Then, the control module 210 updates the numbers $N_{P2}$ and $N_{P3}$ of the computing units 260 that are presently in the standby state and the off state (step S714).

Moreover, when the control module 210 determines that the number $N_{P1}$ is equal to or smaller than the first number $N_{N1}$ in the step S704, in step S716, the control module 210 further determines whether $(N_{N1}+N_{N2}-N_{P1}-N_{P2})$ is smaller than or equal to the number $N_{P3}$ of the computing units 260 that are presently in the off state. When $(N_{N1}+N_{N2}-N_{P1}-N_{P2})$ is smaller than or equal to the number $N_{P3}$, it represents that there are enough computing units 260 to be in the busy state and the standby state within the next period. Accordingly, the control module 210 turns on $(N_{N1}+N_{N2}-N_{P1}-N_{P2})$ computing units 260 that are in the off state (step S718). Then, the control module 210 updates the numbers $N_{P1}$ and $N_{P3}$ of the computing units 260 that are presently in the busy state and the off state (step S720). Moreover, the control module 210 controls $(N_{N2}-N_{P2})$ computing units 260 that are presently in the busy state to disable the services thereof and enter the standby state (step S722). Then, the control module 210 updates the numbers $N_{P1}$ and $N_{P2}$ of the computing units 260 that are presently in the busy state and the standby state (step S724).

Moreover, when the control module 210 determines that $(N_{N1}+N_{N2}-N_{P1}-N_{P2})$ is greater than the number $N_{P3}$ of the computing units 260 that are presently in the off state in the step S716, it represents that the number of the computing units 260 to be in the standby state within the next period will be inadequate. Accordingly, the control module 210 sends a warning signal indicating that the number of the computing units 260 to be in the standby state within the next period will be inadequate (step S726), and turns on $N_{P3}$ computing units 260 that are in the off state (step S728). The services provided by the $N_{P3}$ computing units 260 that are turned on from the off state are accordingly enabled, and the states thereof are directly varied from the off state to the busy state. Then, the control module 210 updates the numbers $N_{P1}$ and $N_{P3}$ of the computing units 260 that are presently in the busy state and the off state (step S730), and the updated number $N_{P3}$ is equal to zero. In other words, all of the normal computing units 260 are not in the off state at this time.

Then, the control module 210 determines whether the updated number $N_{P1}$ is greater than or equal to the first number $N_{N1}$ (step S732). When the updated number $N_{P1}$ is greater than or equal to the first number $N_{N1}$, the control module 210 controls $(N_{P1}-N_{N1})$ computing units 260 that are presently in the busy state to disable the services thereof and enter the standby state (S734). Then, the control module 210 updates the numbers $N_{P1}$ and $N_{P2}$ of the computing units 260 that are presently in the busy state and the standby state (step S736).

Moreover, when the control module 210 determines that the updated number $N_{P1}$ is smaller than the first number $N_{N1}$ in the step S732, the control module 210 further determines whether $(N_{P1}+N_{P2})$ is greater than or equal to the first number $N_{N1}$ (step S738). When $(N_{P1}+N_{P2})$ is greater than or equal to the first number $N_{N1}$, it represents that there are enough computing units 260 to be in the busy state to provide the services within the next period. Accordingly, the control module 210 controls ($N_{N1}-N_{P1}$) computing units 260 that are presently in the standby state to enable the services thereof and enter the busy state (step S740). Then, the control module 210 updates the numbers $N_{P1}$ and $N_{P2}$ of the computing units 260 that are presently in the busy state and the standby state (step S736). Comparatively, when ($N_{P1}+N_{P2}$) is smaller than the first number $N_{N1}$, it represents that the number of the computing units 260 to be in the busy state to provide services within the next period will be inadequate. Accordingly, the control module 210 sends a warning signal indicating that the number of the computing units 260 to be in the busy state will be inadequate (step S744), and controls $N_{P2}$ computing units 260 that are presently in the standby state to enable the services thereof and enter the busy state (step S746). Then, the control module 210 updates the numbers $N_{P1}$ and $N_{P2}$ of the computing units 260 that are presently in the busy state and the standby state (step S736), and the updated number $N_{P2}$ is equal to zero.

As described above, the control module 210 controls each of the computing units 260 to be in the busy state, the standby state or the off state every a predetermined time period. The predetermined time period is, for example, 15 minutes, a half hour, one hour, or other time lengths. In other words, in an embodiment of the invention, the flow of FIG. 6 or FIGS. 7A-7C is executed every the predetermined time period, so as to vary the states of the computing units 260 in batches based on the pre-estimated network service demands. In this way, excessive power consumption caused by frequent variation of the states of the computing units 260 is avoided.

In summary, the invention provides a method and a power-saving control device for controlling operations of a plurality of computing units. The power-saving control device controls the numbers of the computing units in different operation states according to the pre-estimated network service demands. In this way, the number of the computing units in the busy state is neither excessive to waste power nor inadequate to cause decrease of service quality. Therefore, not only network service quality is maintained, but also the excessive computing units can be turned off to reduce power consumption. Moreover, by controlling the states of the computing units in batches every a predetermined time period, excessive power consumption caused by frequent variation of the states of the computing units is avoided.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for controlling operations of a plurality of computing units, comprising:
   pre-estimating network service demands for the computing units within a next period;
   before the next period, calculating a first number $N_{N1}$ of the computing units expected to be in a busy state and a second number $N_{N2}$ of the computing units expected to be in a standby state within the next period according to the pre-estimated network service demands;
   obtaining a number $N_{P1}$ of the computing units that are in the busy state within the present period;
   determining whether the number $N_{P1}$ of the computing units that are in the busy state within the present period is greater than the first number $N_{N1}$;
   controlling ($N_{P1}-N_{N1}$) computing units that are presently in the busy state to disable services thereof and enter the standby state when the number $N_{P1}$ of the computing units that are in the busy state within the present period is greater than the first number $N_{N1}$;
   when the number $N_{P1}$ of the computing units that are in the busy state within the present period is equal to or smaller than the first number $N_{N1}$, determining whether ($N_{N1}+N_{N2}-N_{P1}-N_{P2}$) is smaller than or equal to a number $N_{P3}$ of the computing units that are presently in an off state, wherein $N_{P2}$ is the number of the computing units that are presently in the standby state; and
   when ($N_{N1}+N_{N2}-N_1-N_{P2}$) is smaller than or equal to the number $N_{P3}$, turning on ($N_{N1}+N_{N2}-N_{P1}-N_{P2}$) computing units that are in the off state, and controlling ($N_{N2}-N_{P2}$) computing units that are presently in the busy state to disable services thereof and enter the standby state.

2. The method for controlling operations of the computing units as claimed in claim 1, wherein the step of pre-estimating network service demands for the computing units within the next period comprises:
   obtaining network service demands $L_P$ for the computing units within a present period;
   pre-estimating a total amount $N_{SYN}$ of network service requests to be received by the computing units within the next period; and
   pre-estimating a total amount $N_{FIN}$ of network service termination requests to be received by the computing units within the next period, wherein the pre-estimated network service demands for the computing units within the next period is ($L_P+N_{SYN}-N_{FIN}$).

3. The method for controlling operations of the computing units as claimed in claim 2, wherein the first number $N_{N1}$ is a smallest integer not less than $$\left(\frac{L_N}{L_{PV} \times V_P}\right),$$

wherein $V_P$ is a number of virtual machines averagely executed by each of the computing units, $L_P$ is network service demands processed by each of the virtual machines, and $L_N$ is the pre-estimated network service demands within the next period.

4. The method for controlling operations of the computing units as claimed in claim 3, wherein the second number $N_{N2}$ is a smallest integer not less than 5. The method for controlling operations of the computing units as claimed in claim 1, wherein the step of controlling the computing units such that the numbers of the computing units that are in the busy state and the standby state within the next period are respectively equal to the first number $N_{N1}$ and the second number $N_{N2}$ further comprises:
   turning off ($N_{P2}-N_{N2}$) computing units that are in the standby state if a number $N_{p2}$ of the computing units that are presently in the standby state is greater than the second number $N_{N2}$ after controlling the ($N_{P1}-N_{N1}$) computing units that are presently in the busy state to disable services thereof and enter the standby state.

6. The method for controlling operations of the computing units as claimed in claim 1, wherein the step of controlling the computing units such that the numbers of the computing units that are in the busy state and the standby state within the next period are respectively equal to the first number $N_{N1}$ and the second number $N_{N2}$ further comprises:

when $(N_{N1}+N_{N2}-N_{P1}-N_{P2})$ is greater than the number $N_{P3}$, turning on $N_{p3}$ computing units that are in the off state.

7. The method for controlling operations of the computing units as claimed in claim 6, wherein the step of controlling the computing units such that the numbers of the computing units that are in the busy state and the standby state within the next period are respectively equal to the first number $N_{N1}$ and the second number $N_{N2}$ further comprises:

after turning on $N_{P3}$ computing units that are in the off state, updating the number $N_{P1}$ of the computing units that are in the busy state within the present period, and determining whether the updated number $N_{P1}$ is greater than or equal to the first number $N_{N1}$; and when the updated number $N_{P1}$ is greater than or equal to the first number $N_{N1}$, controlling $(N_{P1}-N_{N1})$ computing units that are presently in the busy state to disable services thereof and enter the standby state.

8. The method for controlling operations of the computing units as claimed in claim 7, wherein the step of controlling the computing units such that the numbers of the computing units that are in the busy state and the standby state within the next period are respectively equal to the first number $N_{N1}$ and the second number $N_{N2}$ further comprises:

when the updated number $N_{P1}$ is smaller than the first number $N_{N1}$, further determining whether $(N_{P1}+N_{P2})$ is greater than or equal to the first number $N_{N1}$; and when $(N_{P1}+N_{P2})$ is greater than or equal to the first number $N_{N1}$, controlling $(N_{N1}-N_{P1})$ computing units that are presently in the standby state to enable services thereof and enter the busy state.

9. The method for controlling operations of the computing units as claimed in claim 8, wherein the step of controlling the computing units such that the numbers of the computing units that are in the busy state and the standby state within the next period are respectively equal to the first number $N_{N1}$ and the second number $N_{N2}$ further comprises:

when $(N_{P1}+N_{P2})$ is smaller than the first number $N_{N1}$, sending a warning signal, and controlling $N_{P2}$ computing units that are presently in the standby state to enable services thereof and enter the busy state.

10. A power-saving control device, configured to control operations of a plurality of computing units, the power-saving control device comprising:

a storage hardware module, configured to store data;

a prediction hardware module, pre-estimating network service demands for the computing units within a next period according to the data stored in the storage hardware module by calculating a first number $N_{N1}$ of the computing units expected to be in a busy state and a second number $N_{N2}$ of the computing units expected to be in a standby state within the next period according to the pre-estimated network service demands; and a control hardware module, coupled to the prediction hardware module, and is configured to:

obtain a number $N_{P1}$ of the computing units that are in the busy state within the present period;

determine whether the number $N_{P1}$ of the computing units that are in the busy state within the present period is greater than the first number $N_{N1}$;

control $(N_{P1}-N_{N1})$ computing units that are presently in the busy state to disable services thereof and enter the standby state when the number $N_{P1}$ of the computing units that are in the busy state within the present period is greater than the first number $N_{N1}$;

when the number $N_{P1}$ of the computing units that are in the busy state within the present period is equal to or smaller than the first number $N_{N1}$, the control hardware module determines whether $(N_{N1}+N_{N2}-N_{P1}-N_{P2})$ is smaller than or equal to a number $N_{P3}$ of the computing units that are presently in an off state, wherein $N_{P2}$ is the number of the computing units that are presently in the standby state; and when $(N_{N1}+N_{N2}-N_{P1}-N_{P2})$ is smaller than or equal to the number $N_{P3}$, the controller hardware module turns on $(N_{N1}+N_{N2}-N_{P1}-N_{P2})$ computing units that are in the off state, and controls $(N_{N2}-N_{P2})$ computing units that are presently in the busy state to disable services thereof and enter the standby state.

11. The power-saving control device as claimed in claim 10, further comprising:

a load balance hardware module, guiding the network service demands to the normal computing units, and distributing the network service demands to the normal computing units according to computing capability of each of the computing units; and a monitor hardware module, monitoring each of the computing units, reporting state variations of the computing units to the load balance hardware module when states of the computing units are varied, and updating the data in the storage hardware module.

12. The power-saving control device as claimed in claim 10, wherein the prediction hardware module is further configured to:

obtain network service demands $L_P$ for the computing units within a present period;

pre-estimate a total amount $N_{SYN}$ of network service requests to be received by the computing units within the next period; and pre-estimate a total amount $N_{FIN}$ of network service termination requests to be received by the computing units within the next period, wherein the pre-estimated network service demands for the computing units within the next period is $(L_P+N_{SYN}-N_{FIN})$.

13. The power-saving control device as claimed in claim 12, wherein the first number $N_{N1}$ is a smallest integer not less than, wherein $V_P$ is a number of virtual machines averagely executed by each of the computing units, $L_{PV}$ is network service demands processed by each of the virtual machines, and $L_N$ is the pre-estimated network service demands within the next period.

14. The power-saving control device as claimed in claim 13, wherein the second number $N_{N2}$ is a smallest integer not less than $(N_{N1} \times R_B)$, wherein $R_B$ is a backup ratio, $0 \leq R_B \leq 1$.

15. The power-saving control device as claimed in claim 10, wherein the control hardware module is further configured to:

turn off $(N_{P2}-N_{N2})$ computing units that are in the standby state if a number $N_{P2}$ of the computing units that are presently in the standby state is greater than the second number $N_{N2}$ after controlling the $(N_{P1}-N_{N1})$ computing units that are presently in the busy state to disable services thereof and enter the standby state.

16. The power-saving control device as claimed in claim 10, wherein when $(N_{N1}+N_{N2}-N_{P1}-N_{P2})$ is greater than the number $N_{P3}$, the control module turns on $N_{P3}$ computing units that are in the off state.

17. The power-saving control device as claimed in claim 16, wherein after turning on $N_{P3}$ computing units that are in the off state, the control hardware module updates the number $N_{P1}$ of the computing units that are in the busy state within the present period, and determines whether the updated number $N_{P1}$ is greater than or equal to the first number $N_{N1}$; and when the updated number $N_{P1}$ is greater than or equal to the first number $N_{N1}$, the control hardware module controls $(N_{P1}-N_{N1})$ computing units that are presently in the busy state to disable services thereof and enter the standby state.

18. The power-saving control device as claimed in claim 17, wherein when the updated number $N_{P1}$ is smaller than the first number $N_{N1}$, the control hardware module further determines whether $(N_{P1}+N_{P2})$ is greater than or equal to the first number $N_{N1}$; and when $(N_{P1}+N_{P2})$ is greater than or equal to the first number $N_{N1}$, the control hardware module controls $(N_{N1}-N_{P1})$ computing units that are presently in the standby state to enable services thereof and enter the busy state.

19. The power-saving control device as claimed in claim 18, wherein when $(N_{P1}+N_{P2})$ is smaller than the first number $N_{N1}$, the control hardware module sends a warning signal, and controls $N_{P2}$ computing units that are presently in the standby state to enable services thereof and enter the busy state.

* * * * *